United States Patent
Preece

(10) Patent No.: US 11,491,566 B2
(45) Date of Patent: Nov. 8, 2022

(54) ELECTRIC DISCHARGE MACHINING ASSEMBLY

(71) Applicant: ROLLS-ROYCE plc, London (GB)

(72) Inventor: Christopher J. Preece, Derby (GB)

(73) Assignee: Rolls-Royce PLC, London (GB)

( * ) Notice: Subject to any disclaimer, the term of this patent is extended or adjusted under 35 U.S.C. 154(b) by 281 days.

(21) Appl. No.: 16/905,181

(22) Filed: Jun. 18, 2020

(65) Prior Publication Data
US 2020/0398358 A1    Dec. 24, 2020

(30) Foreign Application Priority Data

Jun. 19, 2019 (GB) ..................................... 1908787

(51) Int. Cl.
| | |
|---|---|
| *B23H 7/26* | (2006.01) |
| *B23H 1/04* | (2006.01) |
| *B23H 1/10* | (2006.01) |
| *B23H 9/12* | (2006.01) |

(52) U.S. Cl.
CPC .................. *B23H 7/26* (2013.01); *B23H 1/04* (2013.01); *B23H 1/10* (2013.01); *B23H 9/12* (2013.01)

(58) Field of Classification Search
CPC . B23H 7/26; B23H 9/12; B23H 7/265; B23H 1/10; B32H 1/04
See application file for complete search history.

(56) References Cited

U.S. PATENT DOCUMENTS

| | | | |
|---|---|---|---|
| 4,361,075 A | 11/1982 | Block | |
| 5,126,524 A * | 6/1992 | Moro | B23H 7/105 219/69.12 |
| 6,700,088 B1 * | 3/2004 | Loynes | B23H 7/265 219/69.15 |
| 6,897,400 B1 | 5/2005 | Yuan et al. | |

(Continued)

FOREIGN PATENT DOCUMENTS

| | | | |
|---|---|---|---|
| DE | 2208841 | 8/1973 | |
| GB | 2376203 A * | 12/2002 | B23H 7/265 |

(Continued)

OTHER PUBLICATIONS

Response to Extended Search Report dated Oct. 28, 2020, from counterpart European Application No. 20176450.3 filed Sep. 6, 2021, 73 pp.

(Continued)

*Primary Examiner* — Geoffrey S Evans
(74) *Attorney, Agent, or Firm* — Shumaker & Sieffert, P.A.

(57) ABSTRACT

An electrode guide assembly for an EDM process includes a guide tube having a first end and a second end, a fluid feed portion, a fluid return portion, and an electrode. The guide tube has a set of at least two supporting protrusions, with the protrusions projecting radially inwardly from an inner diametral surface of the guide tube. The electrode is slidably accommodated within the guide tube, with an outer diametral surface of the electrode abutting against the set of supporting protrusions. The first end of the guide tube is in fluid communication with the second end of the guide tube to thereby provide a fluid feed channel, and the second end of the guide tube is in fluid communication with the first end of the guide tube to thereby provide a fluid return channel.

14 Claims, 11 Drawing Sheets

(56) References Cited

U.S. PATENT DOCUMENTS

| | | |
|---|---|---|
| 8,178,814 B2 | 5/2012 | Gold et al. |
| 2005/0184030 A1 | 8/2005 | Bermann et al. |
| 2007/0102402 A1* | 5/2007 | Miyake .................... B23H 9/14 |
| | | 219/69.15 |
| 2015/0330521 A1* | 11/2015 | Marocchini ........... F16K 27/041 |
| | | 137/550 |
| 2018/0080507 A1* | 3/2018 | Smid ....................... B60T 15/02 |

FOREIGN PATENT DOCUMENTS

| | | | |
|---|---|---|---|
| JP | S62107922 | 5/1987 | |
| WO | 2012103017 A2 | 8/2012 | |
| WO | WO-2012103017 A2 * | 8/2012 | ............... B23H 1/00 |

OTHER PUBLICATIONS

Great Britain search report dated Dec. 5, 2019, issued in GB Patent Application No. 1908787.3.
Great Britain search report dated Jun. 11, 2020, issued in GB Patent Application No. 1908787.3.
European search report dated Oct. 28, 2020, issued in European Patent Application No. 20176450.3.

\* cited by examiner

ELECTRIC DISCHARGE MACHINING ASSEMBLY

CROSS-REFERENCE TO RELATED APPLICATIONS

This specification is based upon and claims the benefit of UK Patent Application No. GB1908787.3, filed on 19 Jun. 2019, which is hereby incorporated herein in its entirety.

BACKGROUND

Technical Field

The present disclosure relates to an electrode guide assembly for an electrical discharge machining (EDM) process and particularly, but not exclusively, to an electrode guide assembly for the EDM removal of fasteners.

Description of the Related Art

Electric Discharge Machining (EDM) is a well-known technique that is used for the machining of metal materials. EDM as the title suggests creates an electrical discharge by the removal of material from a workpiece. The electrical discharge phenomenon results from an electrical voltage being applied between an electrode and the workpiece. Typically, the electrical voltage is applied in the form of a high frequency pulsed waveform. In conventional EDM machining operations, the electrode and the workpiece are both immersed in a dielectric fluid bath.

Control of the voltage, pulse frequency, and electrode-to-workpiece gap enable the electrical discharge, and hence the material removal, to be controlled. The mark space ratio of the spark duration versus the quench duration is controlled to ensure that the temperatures of the workpiece and the electrode bulk material do not reach their corresponding melting temperatures.

Complex mechanical assemblies such as, for example, turbofan gas turbine engines, are often required to be disassembled for service, maintenance or repair purposes. The separation of such large assemblies into smaller sub-assemblies or component parts is typically labour intensive with the requirement to separate bolted joints that have been subjected to extremes of thermal and/or mechanical conditions. Such bolted joints are frequently mechanically seized and require machining operations in order to separate them.

Conventional machining techniques often cannot be used to separate such joints assemblies due to the work hardening nature of the materials. Furthermore, there are often access limitations resulting from the design of the assembly that result in fasteners that have very limited access. Such limited access prohibits the use of conventional machining techniques because the machine tool cannot reach the fastener.

An example of a prior art portable EDM device is disclosed in U.S. Pat. No. 8,178,814. This portable device requires an operator to hold a tool against a workpiece whilst an electrode is advanced towards the surface of the workpiece. Such tools are restricted to use in regions that are easily accessible by hand because the operator must apply a force against the workpiece surface to operate the device. Direct line of sight to the region to be eroded is required for positioning. The reach of such devices is limited to the length of arm of the operator and the operator's ability to see the target surface. Furthermore the portable device must be positioned within approximately 100 mm of the working surface.

There is therefore a need to be able to use an EDM device in situations where the EDM device is positioned more than 100 mm from the working surface, and where direct line of sight to the region to be eroded is not available.

SUMMARY

According to a first aspect of the present disclosure there is provided an electrode guide assembly for an EDM process, the assembly comprising: a guide tube having a first end and a second end;
a fluid feed portion;
a fluid return portion; and
an electrode,
the guide tube having a set of at least two supporting protrusions, the protrusions projecting radially inwardly from an inner diametral surface of the guide tube, the electrode being slidably accommodated within the guide tube, with an outer diametral surface of the electrode abutting against the set of supporting protrusions,
the first end of the guide tube being in fluid communication with the second end of the guide tube to thereby provide a fluid feed channel, the second end of the guide tube being in fluid communication with the first end of the guide tube to thereby provide a fluid return channel.

The electrode guide assembly of the present invention includes supporting protrusions that provide mechanical support for the electrode and resist the movements caused by buckling forces. This provides for a greater range of operation of a hand-held EDM device than is possible with the devices of the prior art.

The radially inwardly protruding supporting protrusions allow for axially slidable movement of the electrode with reduced frictional forces due to the reduced contact area between the supporting protrusions and the electrode. The supporting protrusions in a set also define a number of passages circumferentially therebetween that provide for the feed and/or return of a dielectric fluid along the electrode guide tube.

The electrode guide assembly enables the EDM tool itself to be located remote to the region with the fastener to be eroded. This allows the EDM process to be performed on fasteners or other features in locations that are not readily accessible to an operator. For example, the tool could be up to 1000 mm from the fastener to be eroded. Alternatively, or additionally, the fastener to be eroded might be only partially accessible.

The electrode guide assembly of the present invention enables a greater flexibility of operation over greater distances and within confined and/or dark areas beyond an operator's line of sight. This makes the EDM process considerably more versatile and useful for a user. It also enables EDM erosion of fasteners to be undertaken in a much wider range of engineering situations which can make assembly strip-down both faster and simpler than relying on the use of prior art tools.

The electrode guide assembly provides a first fluid route for the feed of a dielectric fluid to a working end of the electrode, together with a second fluid route for the return of the dielectric fluid from the working end of the electrode.

Optionally, the guide tube has a set of three supporting protrusions.

In one arrangement, the three supporting protrusions are equally spaced circumferentially around an inwardly facing surface of the guide tube. This provides for three equally sized passages arranged circumferentially between the three supporting protrusions.

In another arrangement, the three supporting protrusions are equally spaced circumferentially around an inwardly facing surface of the guide tube. This alternative arrangement provides for two equally sized passages and a single third passage arranged circumferentially between the three supporting protrusions. An example of this alternative arrangement could provide for two equally sized passages and a third smaller passage. This would enable, for example, a pair of equally sized feed and return channels and a third smaller passage. In this way the flow rate of dielectric fluid along and back the guide tube may be maximised while maintaining a three point contact between the guide tube and the electrode.

Optionally, the set of supporting protrusions extend continuously along the entire length of the guide tube.

In this arrangement the supporting protrusions provide location and support to the electrode along the entire length of the guide tube. Such an arrangement of guide tube would be readily manufactured by an extrusion type process making it easy and cheap to manufacture.

Optionally, the assembly further comprises a plurality of sets of supporting protrusions, and wherein the sets of supporting protrusions are spaced axially apart along the entire length of the guide tube.

By spacing the sets of supporting protrusions along the axial length of the guide tube the frictional force between the electrode and the guide tube may be reduced making the electrode guide assembly more attractive to a user. The sets of supporting protrusions may be positioned at specific points where support of the electrode is critical, for example at the points at which the axis of the guide tube changes directions, i.e. bends or angles in the guide tube.

Optionally, the spacing between axially adjacent sets of supporting protrusions is between 3L and 8L, where L is the axial length of the supporting protrusions.

The selection of a spacing between adjacent sets of supporting protrusions of between 3L and 8L provides a balance between reducing the frictional force between the electrode and the guide tube, and increasing the potential for the electrode to buckle in the space between adjacent sets of supporting protrusions.

Optionally, an axial length of each supporting protrusion is greater than an internal diameter of the guide tube.

Selecting an axial length of each supporting protrusion to be greater than an internal diameter of the guide tube ensures that the supporting protrusion can provide sufficient mechanical support to the sliding electrode without being worn away by this sliding motion.

Optionally, the fluid feed channel is internal to the electrode, and the fluid return channel is between the inner diametral surface of the guide tube and the outer diametral surface of the electrode.

In this arrangement, the electrode is hollow and a fluid feed channel for the dielectric fluid is provided through the centre of the electrode. The fluid return channel is provided by one or more of the passages that are defined circumferentially between adjacent ones of the supporting protrusions in a set. This eliminates the need for a separate fluid return hose or other fluid collection device.

Optionally, each of the fluid feed channel and the fluid return channel is between the inner diametral surface of the guide tube and the outer diametral surface of the electrode.

In this alternative arrangement, the fluid feed channel and the fluid return channel are each provided by one of the passages that are defined circumferentially between adjacent ones of the supporting protrusions in a set. In this arrangement the electrode may have a solid cross-section. This arrangement may be more straightforward to implement for a user because it is not necessary to have access to the centre portion of the electrode for connection to the fluid feed route.

Optionally, each set of supporting protrusions comprises N supporting protrusions, where N≥2, the N supporting protrusions defining N semi-annular cavities therebetween, one or more of the semi-annular cavities forming the fluid feed channel, and another one or more of the semi-annular cavities forming the return channel.

In this alternative arrangement, the fluid feed channel and the fluid return channel are each provided by one of the passages that are defined circumferentially between adjacent ones of the supporting protrusions in a set. In this arrangement the electrode may have a solid cross-section. This arrangement may be more straightforward to implement for a user because it is not necessary to have access to the centre portion of the electrode for connection to the fluid feed route.

Optionally, each set of supporting protrusions defines an electrode support circumference, a cumulative circumferential length of the radially innermost surface of each supporting protrusion in a set being between 0.4 and 0.7 of the electrode support circumference.

The circumference defined by the radially innermost surfaces of each supporting protrusion in a set of supporting protrusions is termed an 'electrode support circumference'. The total circumferential length of the radially innermost surfaces of each supporting protrusion in any set of supporting protrusions is between 0.4 and 0.7 of this electrode support circumference.

In one arrangement the total circumferential length of the radially innermost surfaces of each supporting protrusion in any set of supporting protrusions is 0.5 of the electrode support circumference. In other words half of the circumference is occupied by the radially innermost surfaces of the supporting protrusions, while the other half of the circumference is the passages therebetween.

Optionally, the assembly further comprises an offset transfer portion, the offset transfer portion comprising a housing:

the housing enclosing:

an input electrode;

a lateral transfer electrode; and an output electrode, wherein the lateral transfer electrode has a first end and an opposite second end, the first end being conductively connected to the input electrode, and the second end being conductively connected to the output electrode, a longitudinal axis of the input electrode being offset from a longitudinal axis of the output electrode, and wherein axial movement of the input electrode results in a corresponding axial movement of the output electrode.

The offset transfer portion allows axial movement of the electrode while transferring the direction of travel by an offset distance. This enables the movement of the electrode to 'step over' or bypass obstacles or other structural features in order to position the electrode in the region where the fastener or other feature is to be eroded.

Optionally, the guide tube is formed from a material selected from the group consisting of thermoplastics, thermo-setting plastics, and fibre reinforced composite materials.

In one arrangement the guide tube is formed by additive layer manufacturing. Alternatively, the guide tube may be formed by other manufacturing methods such as extrusion, casting, or fabrication from sub-components.

Optionally, the assembly further comprises a universal joint, the universal joint comprising:
- a first yoke;
- a second yoke;
- a cross; and
- a flexible gaiter, wherein the first and second yokes are positioned at 90 to one another, the first and second yokes being connected to one another by the cross, the electrode passing through a hole in a centre portion of the cross, and the flexible gaiter extending from the first yoke to the second yoke.

The universal joint is formed as a conventional yoke and cross universal joint. This is a well-known engineering component allowing transmission of rotary motion across an angular misalignment between input and output shafts. Its structure and performance will not be described further here.

The cross portion is provided with a central hole through which the electrode passes. In this arrangement, the fluid feed channel is internal to the electrode. The pair of yokes and cross are all contained within a flexible rubber gaiter that contains the entire universal joint assembly. The fluid return channel is defined between the electrode and the rubber gaiter.

According to a second aspect of the present disclosure there is provided an EDM fastener erosion device, the device comprising:
- a housing configured to be positioned on a surface of a workpiece and proximal to a fastener to be eroded;
- an electrode guide assembly according to the first aspect, the erosion electrode positioned at least partially within the housing, the erosion electrode being movable relative to the housing along a longitudinal axis of the fastener, the housing being positioned at the second end of the guide tube;
- a ground electrode being conductively connected to the fastener; and
- a dielectric fluid supply being configured to deliver a dielectric fluid to a region between the erosion electrode and the fastener;

wherein the electrode is slidably accommodated within the electrode guide assembly, the fastener location housing is positioned at the second end of the guide tube, the dielectric fluid supply is configured to provide a supply of a dielectric fluid along the guide tube from the first end to the second end and thence to a region between the erosion electrode and the fastener.

An EDM fastener erosion device utilising the electrode guide assembly according to the first aspect is able to access fasteners that are positioned in locations that are inaccessible to a human operator using conventional EDM erosion tools. Consequently, the fastener erosion device of the present disclosure provides a user with increased versatility and convenience in use.

Optionally, the EDM fastener erosion device further comprises an electrode advance mechanism, the electrode advance mechanism being positioned at a first end of the electrode guide assembly, the electrode advance mechanism being configured to provide axial movement of the electrode within the guide tube.

In this arrangement an electrode advance mechanism is mounted at a proximal end of the electrode guide assembly. This enables the EDM fastener erosion device to be readily manipulated by a user when positioning the erosion electrode against a fastener to be eroded.

Optionally, the housing comprises one or more alignment portions, and the or each alignment portion of the housing is configured to locate against the fastener, to secure the housing proximal to the fastener.

The interconnection between the one or more alignment portions and the geometry of the fastener means that the housing of the EDM device can be securely held against the fastener without the need for an operator to hold the housing in place. This enables the EDM device to be secured against a fastener to be eroded without the continued positional intervention of a human operator. In other words, the operator can 'clip' or otherwise attach the housing to the fastener and then operate the EDM electrode without having to hold the housing against the fastener. This makes the EDM device more useful and hence convenient for a user.

Optionally, the fastener extends from the workpiece, the workpiece comprises one or more alignment features, the housing comprises one or more alignment portions, and the or each alignment portion of the housing is configured to locate against a corresponding alignment feature of the workpiece, to secure the housing proximal to the fastener.

The interconnection between the one or more alignment portions and the corresponding alignment features means that the housing of the EDM device can be securely held against the surface of the workpiece without the need for an operator to hold the housing in place. This enables the EDM device to be operated in regions which are inaccessible to a human operator. This in turn makes the EDM device more useful and hence convenient for a user.

Optionally, the housing is configured to enclose a working volume when positioned against the workpiece, the fastener extends from the workpiece into the working volume, the erosion electrode moves within the working volume, and the dielectric fluid is delivered into the working volume.

By enclosing a working volume, the housing provides a limited space into which the dielectric fluid is delivered. This means that a smaller volumetric flow rate of the dielectric fluid will be required to flood the region between the erosion electrode and the fastener.

According to a third aspect of the present disclosure there is provided a EDM dielectric fluid flow control valve for regulating a pressure of a dielectric fluid during an EDM process, the control valve comprising:
- a housing, the housing comprising;
- a spool valve having a first end and a second end; and
- a spring, wherein the spool valve and the spring are located within the housing, the spool valve being biased in a closed position by the spring, the housing comprising a signal flow inlet port, the first end of the spool valve being configured to receive a signal flow from the signal flow inlet port to thereby cause movement of the spool valve from the closed position to an open position, the housing further comprising a main flow inlet port and a main flow outlet port, with the spool valve allowing a main flow from the main flow inlet port to the main flow outlet port when the spool valve is in the open position.

The operation of the EDM fastener erosion device involves various timed operations and sequences such as, for example the initiation and maintenance of the spark between the erosion electrode and the fastener, and also the flow of the electrolyte.

For the spark process to be correctly initiated it is required that the appropriate flow of electrolyte is first in place. A continuous and consistent spark erosion process can only occur in the presence of the electrolyte. Consequently in order to ensure the correct operation of the EDM erosion apparatus at greater ranges (i.e. using the electrode guide assembly of the present disclosure) it is necessary that the electrolyte reaches the erosion site as quickly as possible and likewise is returned without delay. While this requirement can be met by simply increasing the electrolyte supply system pressure, such a solution requires a system-wide redesign to accommodate the increased pressures.

Alternatively, the EDM dielectric fluid flow control valve of the present disclosure allows for the isolation of the area that is evacuated after the cutting operation leaving a selected portion of electrolyte supply line charged with electrolyte.

The flow control valve of the present disclosure may be included in the body of the EDM fastener erosion device at the proximal end of the electrode guide assembly thereby locally isolating the electrolyte. The return check valve is normally closed and is opened by a pilot feed tapped off the electrolyte feed pressure line.

When the feed pressure increases a normally-closed spring check valve opens allowing electrolyte flow along the electrode guide tube. When the feed pressure drops, the valve spring closes the path of the electrolyte flow. In this way the fluid pressure of the electrolyte at the distal end of the electrode guide tube is maintained at or close to the working pressure. This increases the availability of the EDM erosion process and so makes the process faster and more convenient for a user.

Optionally, the housing further comprises a signal flow outlet port to accommodate a spill portion from the signal flow.

According to a fourth aspect of the present disclosure there is provided a method of electro-discharge machining a fastener, the fastener being located in a workpiece, the method comprising the steps of:
  providing an EDM device comprising a housing, an electrode guide assembly according to the first aspect, and a ground electrode, the housing being positioned at the second end of the guide tube;
  positioning the housing on a surface of the workpiece and proximal to the fastener;
  positioning the ground electrode in conductive connection with the fastener;
  delivering a dielectric fluid along the guide tube from the first end to the second end, and thence to the housing in a region between the erosion electrode and the fastener;
  moving the erosion electrode towards the fastener along a longitudinal axis of the fastener; and
  generating an electrical potential in the erosion electrode sufficient to cause a breakdown in a gap between the erosion electrode and the fastener, to thereby cause a portion of the fastener to be eroded, the eroded portion being suspended in the dielectric fluid.

The EDM device of the disclosure can be used in a location in which the fastener to be eroded is not easily accessible by hand. Indeed provided the housing of the EDM device can be positioned proximal to the fastener to be eroded then the EDM device can be operated to erode the fastener. This positioning operation may be carried out by a manipulator, whether robotic, autonomous or mechanically controlled by an operator.

In contrast, prior art portable EDM devices are restricted to use in regions in which an operator can both reach the fastener to be eroded and in which the operator has a direct line of sight to the fastener so that the EDM device can be correctly positioned. Incorrect positioning of such a portable EDM device can results in erosion of the incorrect part of the workpiece, which may result in the workpiece requiring costly and lengthy repair or even in the workpiece being scrapped.

Optionally, the step of positioning the housing on a surface of a workpiece and proximal to the fastener, comprises the steps of:
  providing at least one alignment feature on the workpiece;
  providing the housing with at least one alignment portion; and
  positioning the housing on the surface of the workpiece and proximal to the fastener with the or each alignment portion being located against a corresponding one of the or each alignment features.

The interconnection between the one or more alignment portions and the corresponding alignment features means that the housing of the EDM device can be securely held against the surface of the workpiece without the need for an operator to hold the housing in place. This enables the EDM device to be operated in regions which are inaccessible to a human operator. This in turn makes the EDM device more useful and hence convenient for a user.

Optionally, the method comprises the additional step of:
  evacuating the dielectric fluid from the housing along the electrode guide assembly.

The dielectric outlet provides a suction pressure to evacuate the dielectric fluid from the region between the erosion electrode and the fastener. This prevents the dielectric fluid from spilling over the workpiece and makes the EDM device more practical in the factory setting.

The dielectric outlet evacuates the dielectric fluid that has occupied the space between the erosion electrode and the fastener and has accumulated eroded particles from the fastener. This particle laden dielectric fluid can then be filtered to remove the debris particles and recycled back to the dielectric inlet.

According to a fifth aspect of the present disclosure there is provided a computer program that, when read by a computer, implements the method of electro-discharge machining a fastener according to the fourth aspect.

According to a sixth aspect of the present disclosure there is provided a non-transitory computer readable storage medium comprising computer readable instructions that, when read by a computer, implements the method of electro-discharge machining a fastener according to the fourth aspect.

According to a seventh aspect of the present disclosure there is provided a signal comprising computer readable instructions that, when read by a computer, implements the method of electro-discharge machining a fastener according to the fourth aspect.

Consider including claims with broader functional language in the statements of invention. In other words, include claims that use "means for" language.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Other aspects of the disclosure provide devices, methods and systems which include and/or implement some or all of the actions described herein. The illustrative aspects of the disclosure are designed to solve one or more of the problems herein described and/or one or more other problems not discussed.

DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
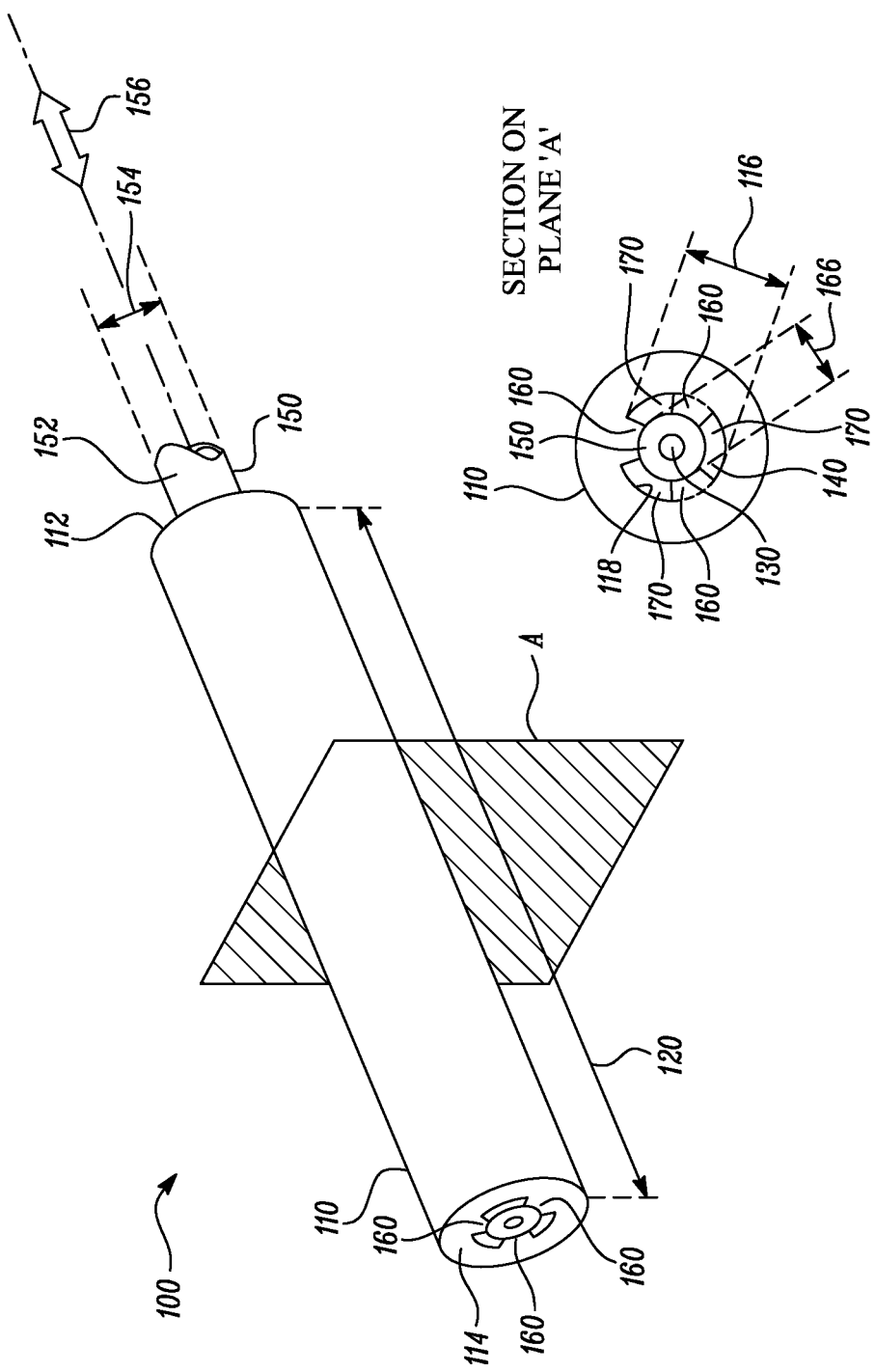
FIG. 1 shows a schematic perspective view of an electrode guide assembly according to a first embodiment of the disclosure.

Referring to FIG. 1, an electrode guide assembly for an EDM process according to a first embodiment of the disclosure is designated generally by the reference numeral 100.

The electrode guide assembly 100 comprises a guide tube 110 and an electrode 150. The guide tube 110 has a first proximal end 112 and an opposite second distal end 114. The guide tube 110 has an inner diametral surface 118 having an internal diameter 116. The guide tube 110 has a length 120.

The guide tube 110 has a set of at least two supporting protrusions 160. In the present arrangement the guide tube 110 has a set of three supporting protrusions 160. Each of the supporting protrusions 160 projects radially inwardly from the inner diametral surface 118. The radially innermost surface of the supporting protrusions 160 defines an electrode support circumference 166. The three supporting protrusions 160 define three semi-annular cavities 170 circumferentially therebetween. This can be seen in the section on plane 'A' of FIG. 1 where the arrangement of supporting protrusions 160 is a circumferential array of alternating supporting protrusions 160 and semi-annular cavities 170.

Figure 2:
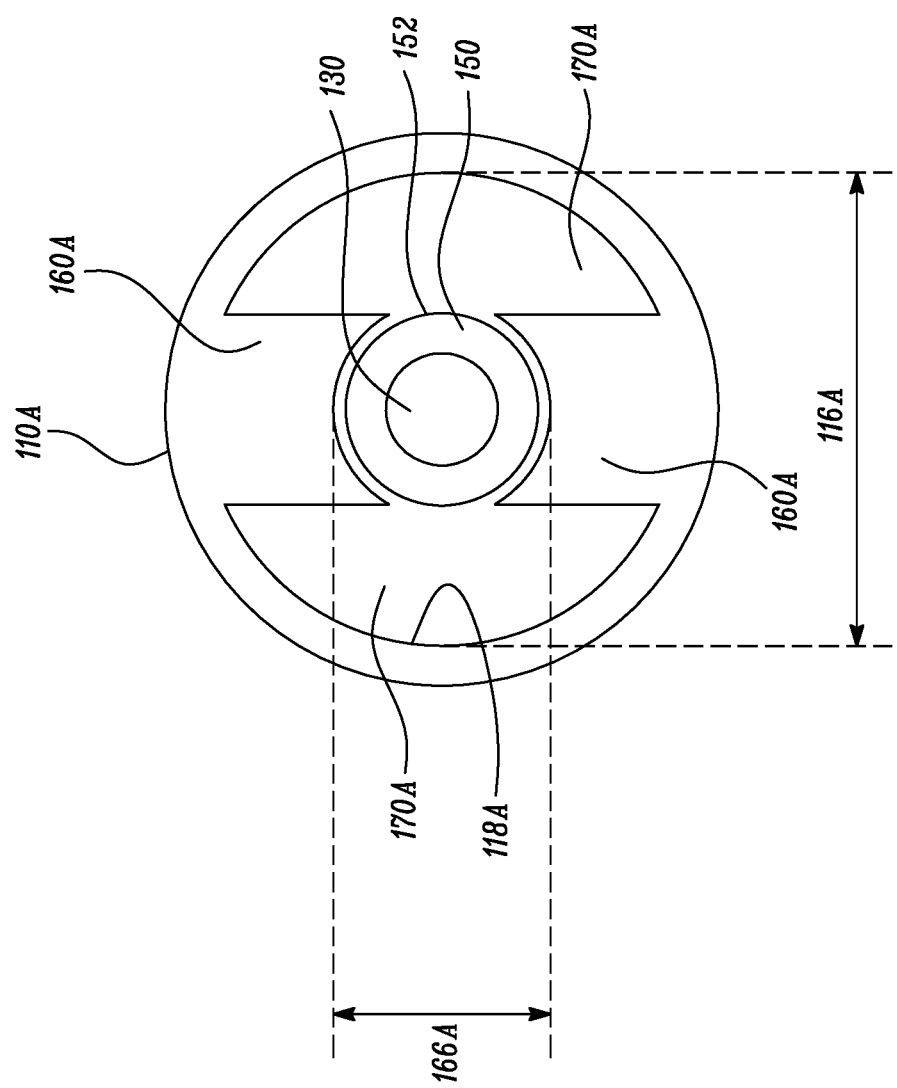
FIG. 2 shows a schematic sectional view of an electrode guide assembly according to a second embodiment of the disclosure.

In an alternative arrangement as shown in FIG. 2, the guide tube 110A has two supporting protrusions 160A, each projecting radially inwardly from the inner diametral surface 118A of the guide tube 110A. The radially innermost surface of the supporting protrusions 160A defines an electrode support circumference 166A. The two supporting protrusions 160A define two semi-annular cavities 170A circumferentially therebetween. The electrode 150 is slidably accommodated within the guide tube 110A with an outer diametral surface 152 of the electrode 150 slidably abutting against the pair of supporting protrusions 160A.

The guide tube 110 of the present arrangement is formed from a thermoplastic material. However in alternative arrangements, the guide tube may be alternatively formed, for example from thermo-setting polymeric materials, or fibre reinforced composite material, or by additive layer manufacturing techniques.

The set of three supporting protrusions 160 extends continuously along the entire axial length 120 of the guide tube 110.

The electrode 150 is slidably accommodated within the guide tube 110 with an outer diametral surface 152 of the electrode 150 slidably abutting against the set of supporting protrusions 160. In other words, the outer diameter 154 of the electrode 150 is sized to be slightly smaller than the electrode support circumference 166 such that the electrode 150 can readily slide within the guide tube 110 as shown by axial movement 156.

The electrode 150 is formed from copper or a copper alloy. In the present arrangement the electrode 150 has an outer diameter 154 of approximately 5 mm. However in other arrangements, this diameter may be in a range between approximately 2 mm and 12 mm or larger.

In the present arrangement the electrode 150 is hollow and the central cavity within the electrode 150 forms a fluid feed channel 140 extending along the axial length 120 of the guide tube 110 in a direction from the first end 112 to the second end 114. Furthermore, in the present arrangement the semi-annular cavities 170 form a fluid return channel 140 extending along the axial length 120 of the guide tube 110 in a direction from the second end 114 to the first end 112.

In an alternative arrangement (not shown) the electrode 150 may be a solid electrode. In this arrangement at least one of the semi-annular cavities 170 defined a fluid feed channel 130, and a further at least one of the semi-annular cavities 170 defined a fluid return channel 140.

Figure 3:
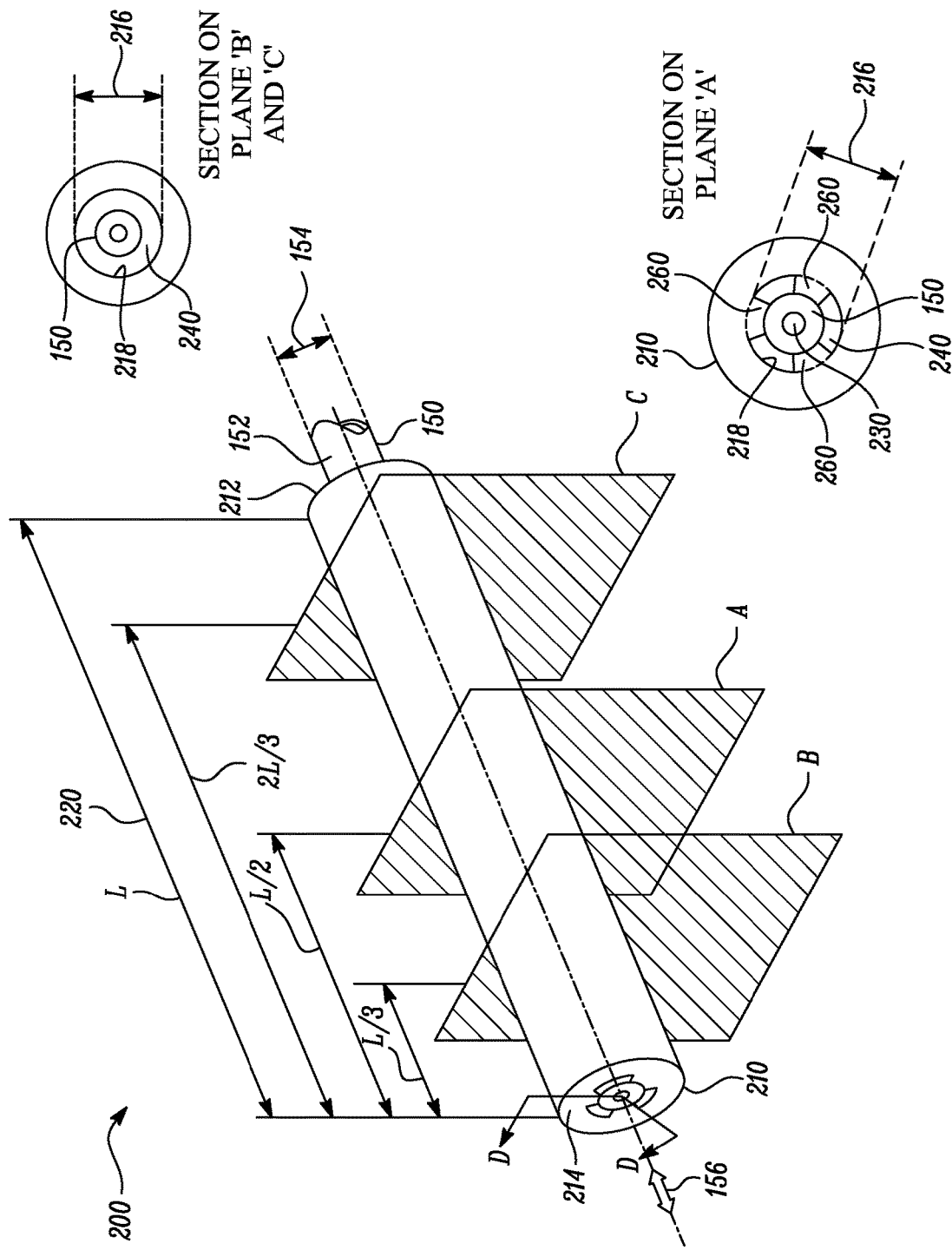
FIG. 3 shows a schematic perspective view of an electrode guide assembly according to a third embodiment of the disclosure.
Figure 4:
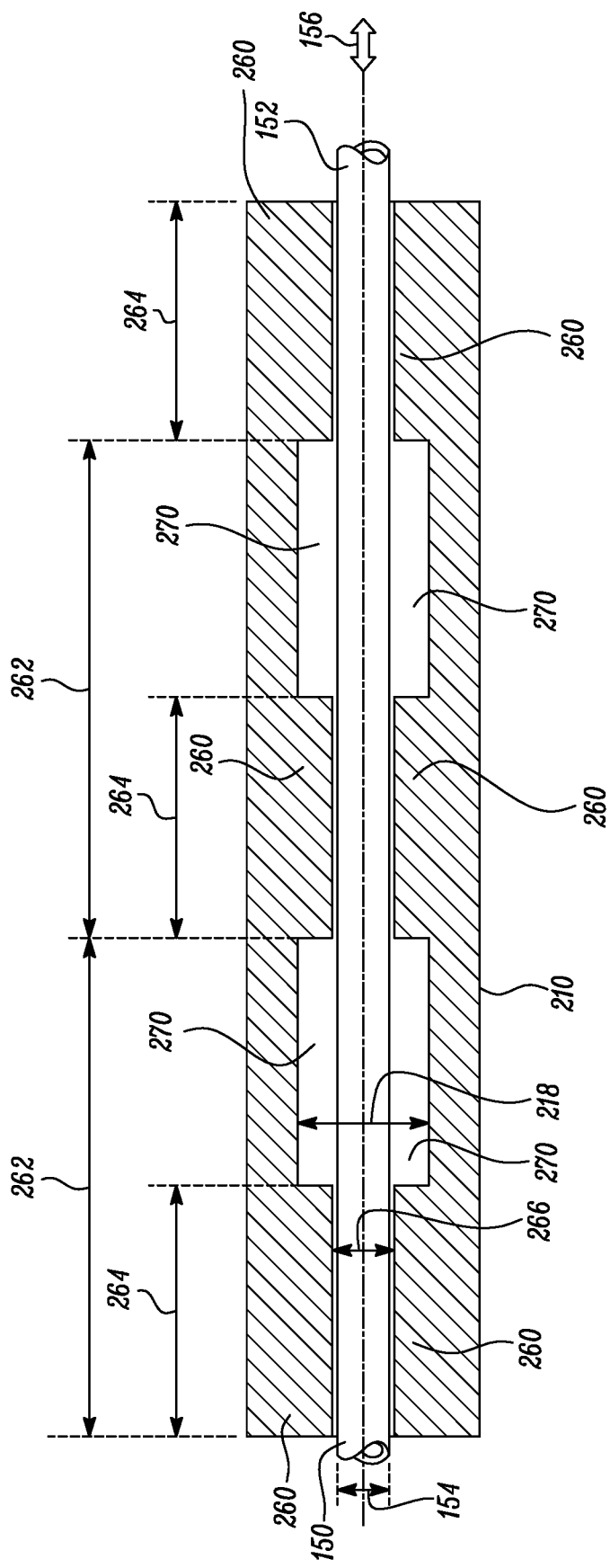
FIG. 4 shows a schematic sectional view of the guide tube of the embodiment of FIG. 3.

Referring to FIGS. 3 and 4, an electrode guide assembly according to a third embodiment of the disclosure is designated generally by the reference numeral 200. Features of the electrode guide assembly 200 which correspond to those of electrode guide assembly 100 have been given corresponding reference numerals for ease of reference.

The electrode guide assembly 200 comprises a guide tube 210 and an electrode 150. The guide tube 210 has a first proximal end 212 and an opposite second distal end 214. The guide tube 210 has an inner diametral surface 218 with an internal diameter 216 and an axial length 220.

In this arrangement the guide tube 210 also has a set of three supporting protrusions 260. As with the first embodiment described above, each of the supporting protrusions 260 projects radially inwardly from the inner diametral surface 218. The radially innermost surface of the supporting protrusions 260 defines an electrode support circumference 266, and the three supporting protrusions 160 define three semi-annular cavities 270 circumferentially therebetween.

However in the third embodiment of the guide assembly 200, there are a plurality of sets of supporting protrusions 160. Each set of supporting protrusions 160 is spaced along the axial length 220 of the guide tube 210. As shown in FIG. 4, each set of supporting protrusions 260 has an axial length 264. Furthermore the sets of supporting protrusions 260 are regularly spaced along the axial length 220 of the guide tube 210 by an axial spacing 262. In an alternative arrangement the sets of supporting protrusions 260 may not all be equally spaced along the axial length 220 of the guide tube 210.

This can be seen in the section on plane 'A' of FIG. 3, and also in FIG. 4, where the arrangement of supporting protrusions 260 is a circumferential array of alternating supporting protrusions 260 and semi-annular cavities 270. The section at plane 'A' in this arrangement corresponds to a mid-point (i.e. L/2, where L is the length of the guide tube 110) along the guide tube 100.

Returning to FIG. 3, the sections on planes 'B' and 'C' correspond to positions along the axial length 220 of the guide tube 210 where there are no supporting protrusions 260. These positions correspond to the L/3 and 2L/3 (where L is the length of the guide tube 110) points along the length 110 of the guide tube 100.

As with the embodiment of FIG. 1, the electrode 150 is slidably accommodated within the guide tube 210 with an outer diametral surface 152 of the electrode 150 slidably abutting against each of the sets of supporting protrusions 260 along the length of the guide tube 210. In other words, the outer diameter 154 of the electrode 150 is sized to be slightly smaller than the electrode support circumference 266 such that the electrode 150 can readily slide within the guide tube 210 as shown by axial movement 156.

In the present arrangement the electrode 150 is hollow and the central cavity within the electrode 150 forms a fluid feed channel 140 extending along the axial length 220 of the guide tube 210 in a direction from the first end 212 to the second end 214. Likewise as previously described in the present arrangement, the semi-annular cavities 270 form a fluid return channel 240 extending along the axial length 220 of the guide tube 210 in a direction from the second end 214 to the first end 212.

In an alternative arrangement (not shown) the electrode 150 may be a solid electrode, with at least one of the semi-annular cavities 270 defining a fluid feed channel 230, and a further at least one of the semi-annular cavities 270 defining a fluid return channel 240.

Figure 5:
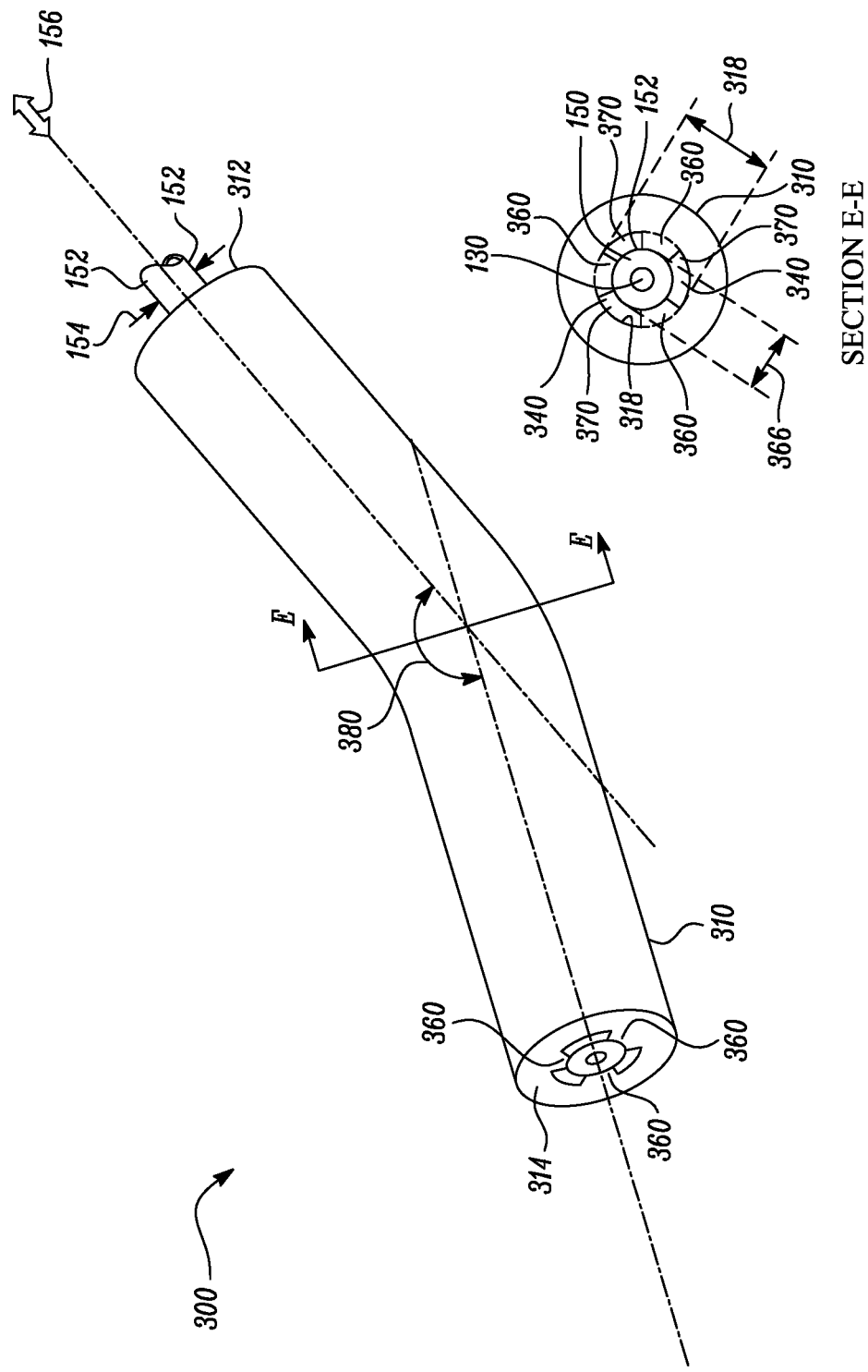
FIG. 5 shows a schematic perspective view of an electrode guide assembly according to a fourth embodiment of the disclosure.

Referring to FIG. 5, an electrode guide assembly according to a fourth embodiment of the disclosure is designated generally by the reference numeral 300. Features of the electrode guide assembly 300 which correspond to those of electrode guide assembly 100 have been given corresponding reference numerals for ease of reference.

The electrode guide assembly 300 includes all of the features of the electrode guide assembly 200 described above and shown in FIGS. 3 and 4 with the additional feature of an angled guide tube 310.

In this arrangement, the guide tube 310 has a bend or kink along the length 320 of the guide tube 310. The bend has an included angle 380. This means that the guide tube 310 can be positioned in configurations in which the second end of the guide tube 310 is in a region that is physically inaccessible to a user or extremely difficult to access by the user.

In all other aspects, the electrode guide assembly 300 corresponds to the electrode guide assembly 200 described in detail above. In other words, the electrode guide assembly 300 comprises a plurality of sets of supporting protrusions 360 that are spaced along a length 320 of the guide tube 310. Furthermore the electrode 150 is slidably positioned within the guide tube 310 and slidably abuts against the radially innermost surfaces of each set of supporting protrusions 360.

Figure 6:
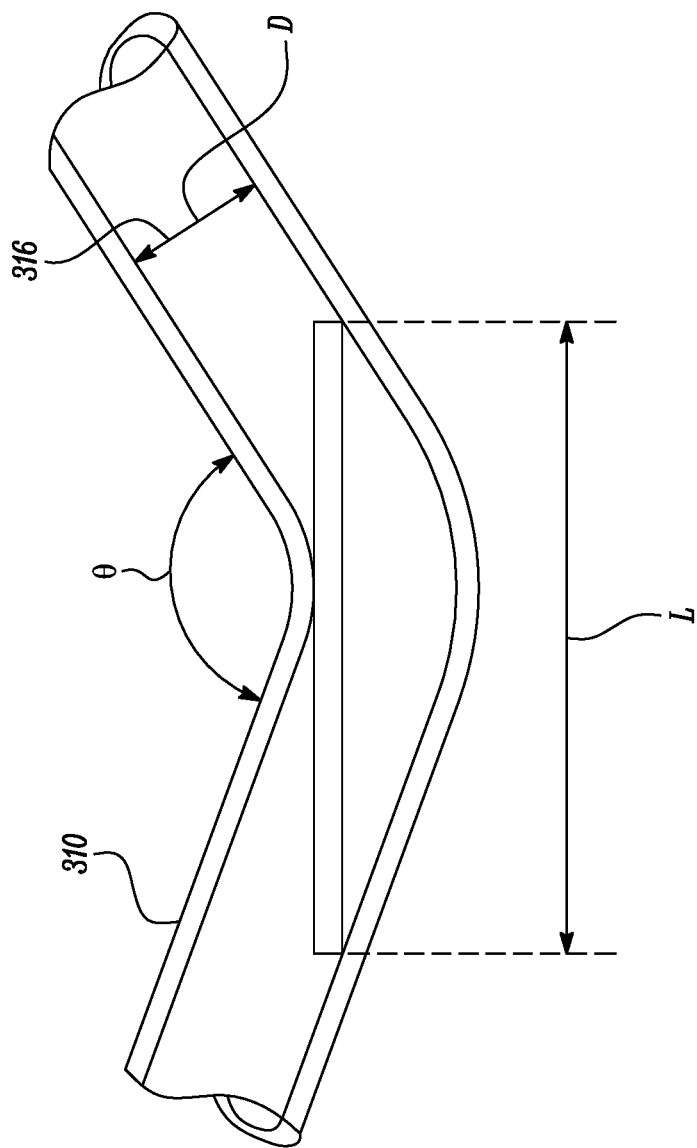
FIG. 6 shows a schematic sectional view of the guide tube of FIG. 5 illustrating the geometric relationship between guide tube diameter and electrode travel.

FIG. 6 shows the angled portion of the guide tube 310 of the fourth embodiment of the disclosure. In particular FIG. 6 illustrates the trigonometrical relationship between the internal diameter 316 (shown as 'ID' in FIG. 6) and the travel 'L' of the electrode 150. This relationship is described by the following equation.

$$X = \left(\left(\frac{A}{2}\right) \times \sin\left(90 - \left(\frac{B}{2}\right)\right)\right) + \left(C \times \left(\frac{\sin\left(90 - \left(\frac{B}{2}\right)\right)}{\tan\left(90 - \left(\frac{B}{2}\right)\right)}\right)\right)$$

The above equation can be simplified as shown below.

$$X = \left(\left(\frac{A}{2}\right) \times \sin\left(90 - \left(\frac{B}{2}\right)\right)\right) + \left(C \times \left(\cos\left(90 - \left(\frac{B}{2}\right)\right)\right)\right)$$

Figure 7:
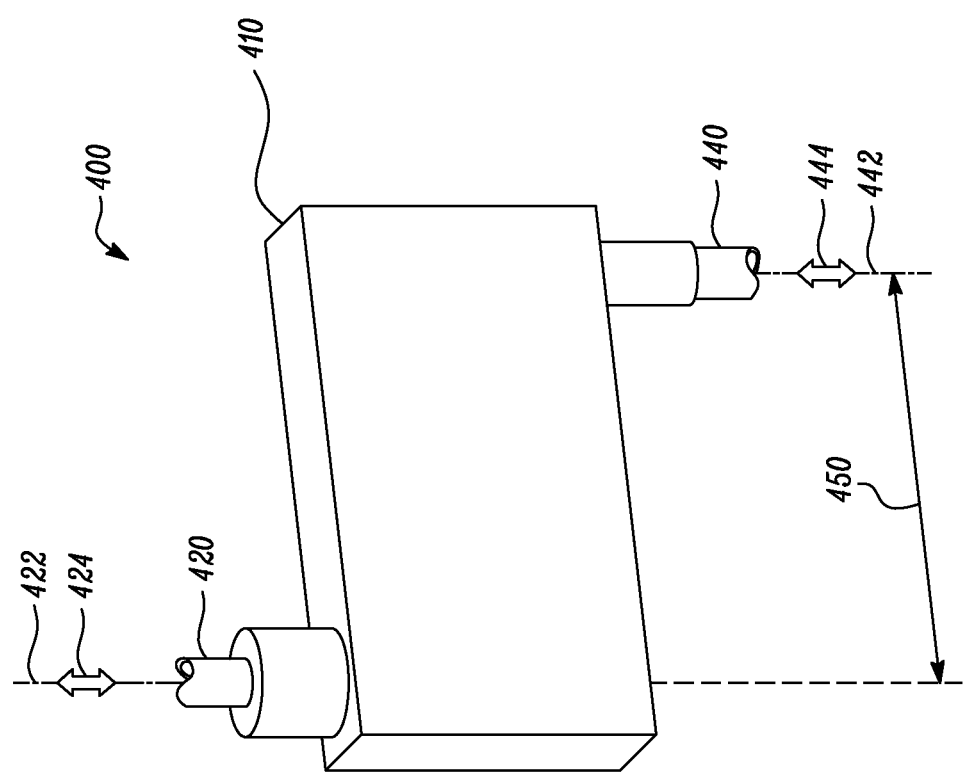
FIG. 7 shows a schematic perspective view of an offset transfer portion according to a fifth embodiment of the disclosure.
Figure 9:
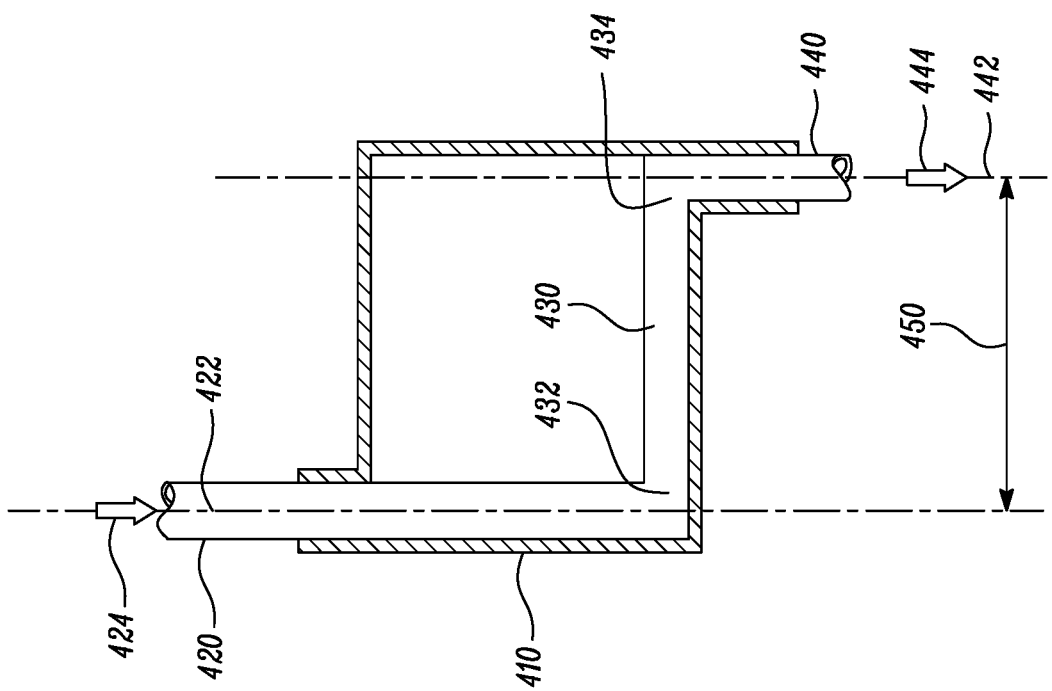
FIG. 9 shows a schematic part-sectional view of the offset transfer portion of FIG. 7 in a second, extended position.
Figure 8:
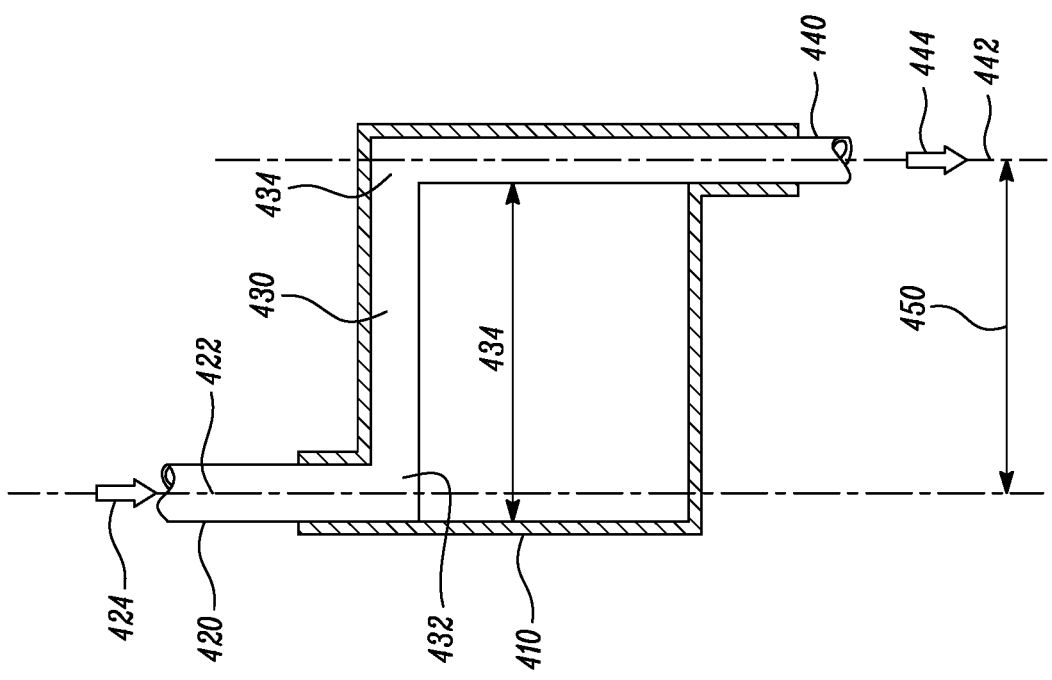
FIG. 8 shows a schematic part-sectional view of the offset transfer portion of FIG. 7 in a first, retracted position.

Referring to FIGS. 7 to 9, an electrode guide assembly according to a fifth embodiment of the disclosure includes an offset transfer portion 400.

The offset transfer portion 400 comprises a housing 410, an input electrode 420, a lateral transfer electrode 430, and an output electrode 440. The input electrode 420 has a longitudinal axis 422 and the input electrode 420 is capable of axial movement 424 along the longitudinal axis 422. Likewise, the output electrode 440 has a longitudinal axis 442 and the output electrode 440 is capable of axial movement 444 along the longitudinal axis 442.

The lateral transfer electrode 430 has a first end 432 and an opposite second end 434. The lateral transfer electrode 430 has a length 436. The first end 432 of the lateral transfer electrode 430 is conductively connected to the input electrode 420, and the second end 434 of the lateral transfer electrode 430. An axial movement 424 of the input electrode 420 therefore results in a corresponding axial movement 444 of the output electrode 440. FIG. 8 shows the offset transfer portion 400 in a first position in which the output electrode 440 is in a retracted position, while FIG. 9 shows the offset transfer portion 400 in a second position in which the output electrode 440 is in an extended position.

The longitudinal axis 422 of the input electrode 420 is axially offset from the longitudinal axis 442 of the output electrode 440 by an offset distance 450 corresponding to the length 436 of the lateral transfer electrode 430.

The offset transfer portion 400 may be incorporated into the electrode guide assembly 100:200:300 of any of the above-described embodiments. When included along the length of the corresponding guide tube 110:210:310 the offset transfer portion 400 allows the electrode 150 to 'step over' or laterally bypass some obstruction while still providing EDM access to a fastener or other feature at a location corresponding t the second distal end 114:214:314 of the guide tube 110:210:310.

Figure 11:
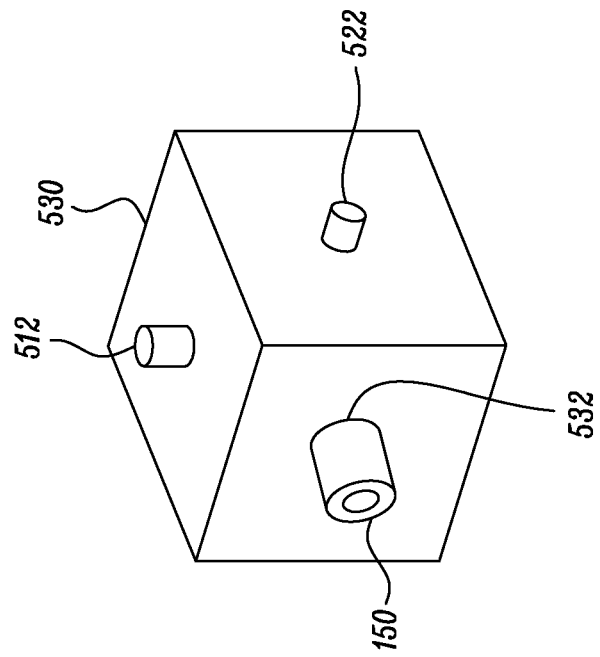
FIG. 11 shows a schematic, perspective view of the cross of the universal joint of FIG. 10.
Figure 10:
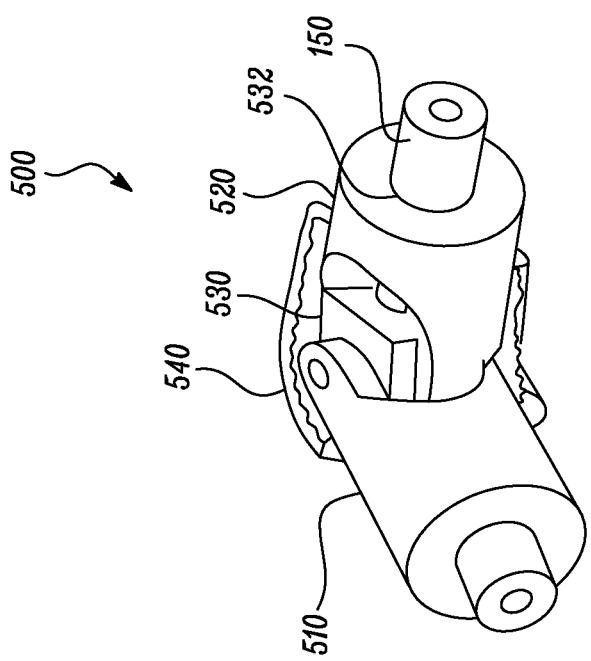
FIG. 10 shows a schematic, part-sectional view of a universal joint according to a sixth embodiment of the disclosure.

FIGS. 10 and 11 relate to an electrode guide assembly according to a sixth embodiment of the disclosure including a universal joint 500.

The universal joint 500 comprises a first yoke 510, a second yoke 520 and a cross 530. The first yoke 510 is rotationally offset from the second yoke 520 by a quarter turn. The cross 530 connects to the first yoke 510 by a pair of first yoke pivots 512, and connects to the second yoke by a pair of second yoke pivots 522. The cross 530 further comprises a hole 532 extending therethrough.

In use, the universal joint 500 might be incorporated at some point along the length 120 of the guide tube 110:210: 310. The electrode 150 is slidable accommodated within the hole 532.

A flexible gaiter 540 extends from the first yoke 510 to the second yoke 520, and fluidly encloses the space between the first yoke 510 and the second yoke 520.

The operation of the universal joint 500 follows that of a conventional mechanical universal joint and consequently will not be discussed further here.

In one arrangement, the electrode 150 may take the form of a flexible conducting tube in which a wire braided outer sleeve encloses a flexible tube. The electrode 150 may be moved axially by the action of the EDM process whilst still allowing the movement of fluid along the tube.

Figure 12:
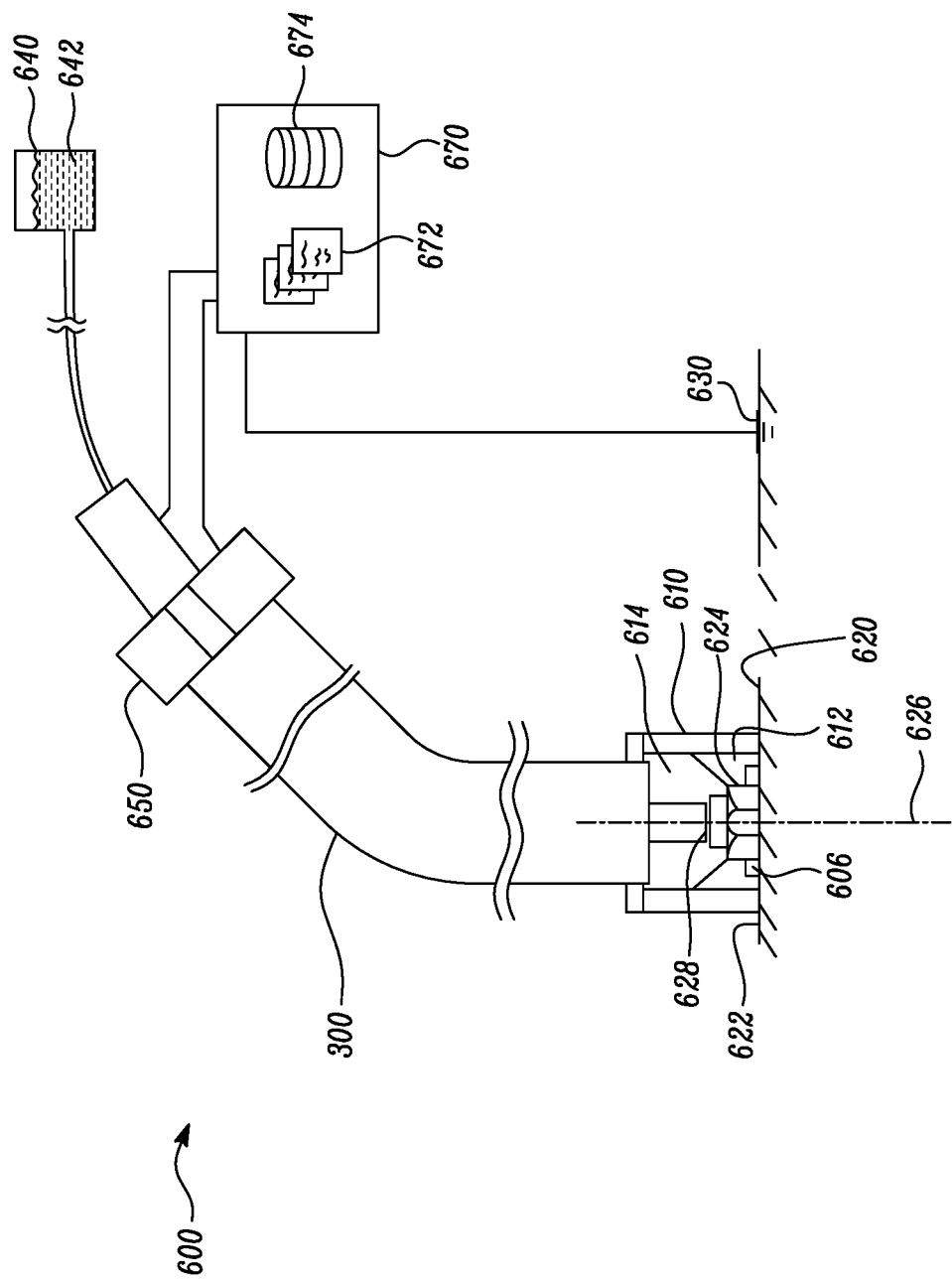
FIG. 12 shows a schematic view of an EDM fastener erosion device according to a seventh embodiment of the disclosure.

Referring to FIG. 12, an EDM fastener erosion device according to a seventh embodiment of the disclosure is designated generally by the reference numeral 600.

Features of the EDM fastener erosion device 600 which correspond to those of electrode guide assembly 100 have been given corresponding reference numerals for ease of reference.

The EDM erosion device 600 comprises a housing 610, an erosion electrode 150, a ground electrode 630 and a dielectric fluid supply 640. The housing 610 can be positioned on a surface 622 of a workpiece 620, and proximal to a fastener 624 that is to be eroded.

The erosion electrode 150 is positioned at least partially within the housing 610. The erosion electrode 150 is movable relative to the housing 610 along the longitudinal axis of the fastener 624.

The ground electrode 630 is conductively connected to the fastener 624. The ground electrode 630 completes an electrical connection back to the erosion electrode 150.

The dielectric fluid supply 640 delivers a flow of a dielectric fluid 642 to a delivery region 628, which is the region between the erosion electrode 150 and the fastener 624.

In operation, the motion of the erosion electrode 150 relative to the fastener 624 is that of a conventional electrodischarge machining operation. An electric voltage in the form of a high frequency pulsed waveform is applied between the erosion electrode 150 and the fastener 624. The erosion electrode 150 is positioned against the fastener 624 with a small gap therebetween, which causes a spark to form in the gap. The details of this EDM operation are well known and will not be described further herein.

To fully realise the potential for confined space long range hand held EDM erosion of fasteners 624 there is a requirement for an operator to see the position of the electrode 150 and thence to be able to guide it to the fastener 624 to be eroded. By incorporating a camera (not shown) into the second end of the guide tube 110:210:310, an operator is provided with real-time location information about the location and orientation of the electrode 150. This in turn allows the operator to manipulate the electrode guide assembly so as to align the erosion electrode 150 with the fasteners axis so as to erode the fastener.

Figure 13:
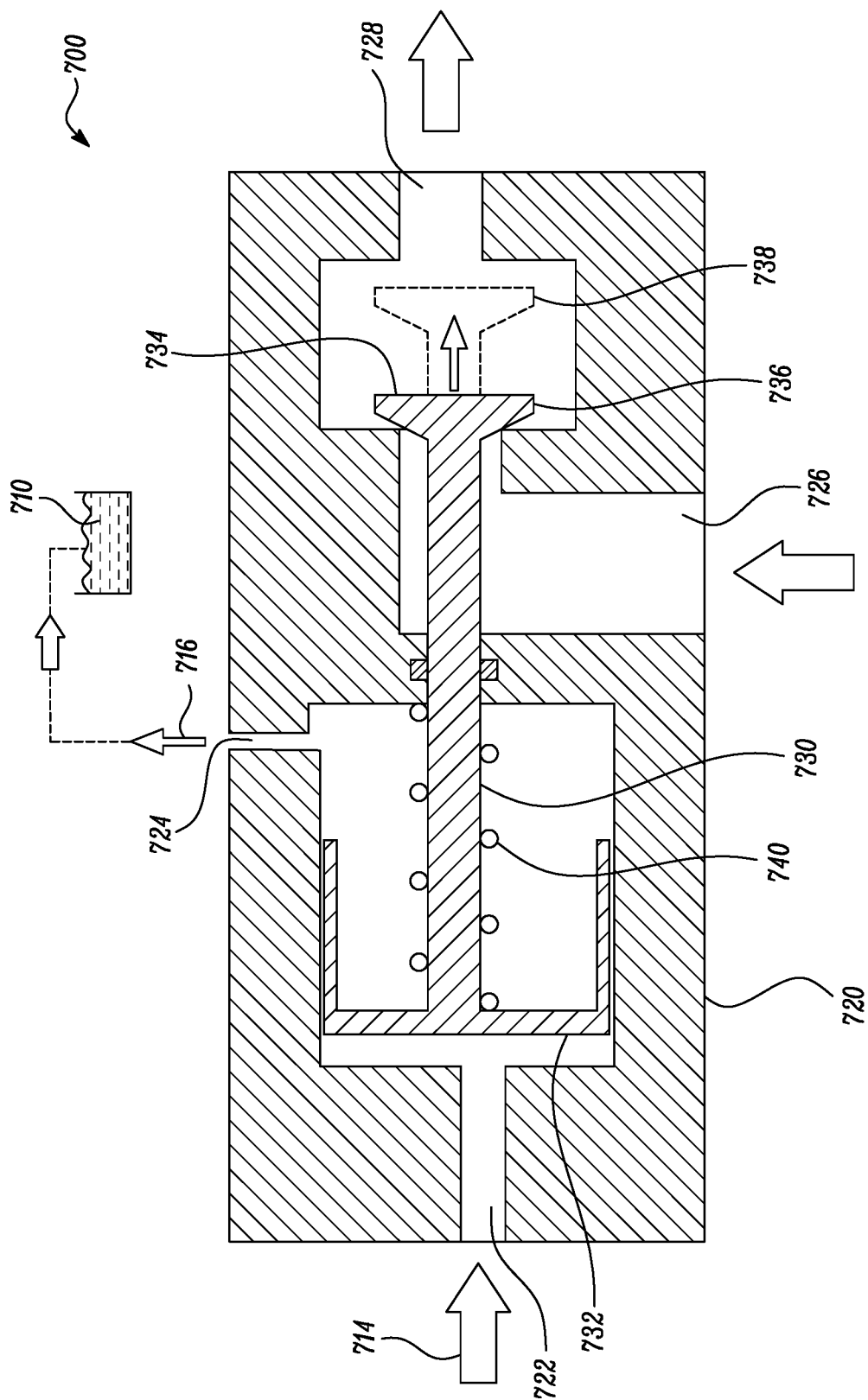
FIG. 13 shows a schematic, sectional view of an EDM dielectric fluid flow control valve according to a eighth embodiment of the disclosure.

Referring to FIG. 13, an electrode guide assembly according to a eighth embodiment of the disclosure includes an EDM dielectric fluid flow control valve 700.

The EDM dielectric fluid flow control valve 700 comprises a housing 720 having a spool valve 730 and a spring 740. The spool valve 730 has a first end 732 and an opposite second end 734.

The spool valve 730 and the spring are accommodated within the housing 720. The spool valve 730 is biased in a closed position 736 by the spring 740. The housing 720 has a signal flow inlet port 722. The first end 732 of the spool valve 730 is adapted to receive a signal flow 714 of a dielectric fluid 710 from the signal flow inlet port 722. The signal flow 714 acts on the first end 732 of the spool valve 730 to thereby cause movement of the spool valve 730 from the closed position 736 to an open position 738.

With the spool valve 730 in the open position, the dielectric fluid 710 can flow from the main flow inlet port 726 to the main flow outlet port 728.

The EDM erosion process relies for its efficient operation on a pressure of dielectric fluid 710 in the region 628 between the erosion electrode 150 and the fastener 624. A conventional hand-held EDM tool will require time to raise the pressure of the dielectric fluid 710 following initiation of erosion by an operator but before erosion can begin.

The dielectric fluid flow control valve 700 of the present embodiment is intended to be positioned at the second end 114:214:314 of the guide tube 110:210:310. This positioning enables a working pressure of the dielectric fluid 710 to be maintained along the length of the guide tube 110:210:310 and means that when the operator initiates the EDM process the delay while the pressure of the dielectric fluid is raised can be significantly reduced over the conventional prior art arrangements.

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a processor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

In addition, where a range of values is provided, it is understood that every intervening value, between the upper and lower limit of that range and any other stated or intervening value in that stated range, is encompassed within the invention.

Except where mutually exclusive, any of the features may be employed separately or in combination with any other features and the disclosure extends to and includes all combinations and sub-combinations of one or more features described herein.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Moreover, in determining extent of protection, due account shall be taken of any element which is equivalent to an element specified in the claims. Various changes to the described embodiments may be made without departing from the spirit and scope of the invention.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The invention claimed is:

1. An electrode guide assembly for an EDM process, the assembly comprising:
a guide tube having a first end and a second end; and
an electrode,
the guide tube having a set of at least two supporting protrusions, the protrusions projecting radially inwardly from an inner diametral surface of the guide tube, the electrode being slidably accommodated within the guide tube, with an outer diametral surface of the electrode abutting against the set of supporting protrusions,
the first end of the guide tube being in fluid communication with the second end of the guide tube to thereby define a fluid feed channel, the second end of the guide tube being in fluid communication with the first end of the guide tube to thereby define a fluid return channel.

2. The assembly as claimed in claim 1, further comprising a plurality of sets of supporting protrusions, and wherein the sets of supporting protrusions are spaced axially apart along the entire length of the guide tube.

3. The assembly as claimed in claim 2, wherein the spacing between axially adjacent sets of supporting protrusions is between 3L and 8L, where L is the axial length of the supporting protrusions.

4. The assembly as claimed in claim 2, wherein an axial length of each supporting protrusion is greater than an internal diameter of the guide tube.

5. The assembly as claimed in claim 1, wherein the fluid feed channel is internal to the electrode, and the fluid return channel is between the inner diametral surface of the guide tube and the outer diametral surface of the electrode.

6. The assembly as claimed in claim 1, wherein each set of supporting protrusions comprises N supporting protrusions, where $N \geq 2$, the N supporting protrusions defining N semi-annular cavities therebetween, one or more of the semi-annular cavities forming the fluid feed channel, and another one or more of the semi-annular cavities forming the return channel.

7. The assembly as claimed in claim 1, wherein each set of supporting protrusions defines an electrode support circumference, a cumulative circumferential length of the radially innermost surface of each supporting protrusion in a set being between 0.4 and 0.7 of the electrode support circumference.

8. The assembly as claimed in claim 1, further comprising an offset transfer portion, the offset transfer portion comprising a housing:
the housing enclosing:
an input electrode;

a lateral transfer electrode; and an output electrode, wherein the lateral transfer electrode has a first end and an opposite second end, the first end being conductively connected to the input electrode, and the second end being conductively connected to the output electrode, a longitudinal axis of the input electrode being offset from a longitudinal axis of the output electrode, and wherein a length of the lateral transfer electrode defines an offset between the input electrode and the output electrode, and axial movement of the input electrode results in a corresponding axial movement of the output electrode.

9. An EDM fastener erosion device, the device comprising:

a housing configured to be positioned on a surface of a workpiece and proximal to a fastener to be eroded;

an electrode guide assembly according to claim 1, the erosion electrode positioned at least partially within the housing, the erosion electrode being movable relative to the housing along a longitudinal axis of the fastener, the housing being positioned at the second end of the guide tube;

a ground electrode being conductively connected to the fastener; and a dielectric fluid supply being configured to deliver a dielectric fluid to a region between the erosion electrode and the fastener;

wherein the electrode is slidably accommodated within the electrode guide assembly, the housing is positioned at the second end of the guide tube, the dielectric fluid supply is configured to provide a supply of a dielectric fluid along the guide tube from the first end to the second end and thence to a region between the erosion electrode and the fastener.

10. The EDM fastener removal device as claimed in claim 9, further comprising an electrode advance mechanism, the electrode advance mechanism being positioned at a first end of the electrode guide assembly, the electrode advance mechanism being configured to provide axial movement of the electrode within the guide tube.

11. The EDM device as claimed in claim 9, wherein the housing comprises one or more alignment portions, and the or each alignment portion of the housing is configured to locate against the fastener, to secure the housing proximal to the fastener.

12. The EDM device as claimed in claim 9, wherein the fastener extends from the workpiece, the workpiece comprises one or more alignment features, the housing comprises one or more alignment portions, and the or each alignment portion of the housing is configured to locate against a corresponding alignment feature of the workpiece, to secure the housing proximal to the fastener.

13. The EDM device as claimed in claim 9, wherein the housing is configured to enclose a working volume when positioned against the workpiece, the fastener extends from the workpiece into the working volume, the erosion electrode moves within the working volume, and the dielectric fluid is delivered into the working volume.

14. A method of electro-discharge machining a fastener, the fastener being located in a workpiece, the method comprising the steps of:

providing an EDM device comprising a housing, an electrode guide assembly according to claim 1, and a ground electrode, the housing being positioned at the second end of the guide tube;

positioning the housing on a surface of the workpiece and proximal to the fastener;

positioning the ground electrode in conductive connection with the fastener;

delivering a dielectric fluid along the guide tube from the first end to the second end, and thence to the housing in a region between the erosion electrode and the fastener;

moving the erosion electrode towards the fastener along a longitudinal axis of the fastener; and generating an electrical potential in the erosion electrode sufficient to cause a breakdown in a gap between the erosion electrode and the fastener, to thereby cause a portion of the fastener to be eroded, the eroded portion being suspended in the dielectric fluid.

* * * * *